(12) United States Patent
Soubelet et al.

(10) Patent No.: US 7,248,727 B2
(45) Date of Patent: Jul. 24, 2007

(54) METHOD AND APPARATUS FOR DISPLAYING IMAGES OF AN OBJECT

(75) Inventors: Elisabeth Soubelet, Haarlem (NL); Serge Muller, Guyancourt (FR); Andreas Rick, Schwerte (DE)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 752 days.

(21) Appl. No.: 10/153,326

(22) Filed: May 22, 2002

(65) Prior Publication Data

US 2003/0012450 A1    Jan. 16, 2003

(30) Foreign Application Priority Data

Jun. 8, 2001   (FR)   ................................. 01 07519

(51) Int. Cl.
*G06K 9/00*   (2006.01)
(52) U.S. Cl. ..................................... 382/132
(58) Field of Classification Search ............... 382/278, 382/131, 128
See application file for complete search history.

(56) References Cited

U.S. PATENT DOCUMENTS

| | | | | |
|---|---|---|---|---|
| 5,452,367 A | | 9/1995 | Bick et al. ................... 382/128 |
| 5,542,003 A | | 7/1996 | Wofford ...................... 382/132 |
| 5,710,801 A | * | 1/1998 | Dillen et al. ................ 378/98.7 |
| 5,734,739 A | * | 3/1998 | Sheehan et al. ............ 382/128 |
| 5,776,063 A | * | 7/1998 | Dittrich et al. ............. 600/408 |
| 6,063,032 A | * | 5/2000 | Grunwald ................... 600/440 |
| 6,068,597 A | * | 5/2000 | Lin ............................. 600/443 |
| 6,193,660 B1 | * | 2/2001 | Jackson et al. ............. 600/443 |
| 6,236,766 B1 | * | 5/2001 | Zavaljevski et al. ........ 382/300 |
| 6,413,217 B1 | * | 7/2002 | Mo ............................. 600/440 |
| 6,418,243 B1 | * | 7/2002 | Skoglund et al. ........... 382/274 |
| 6,574,499 B1 | * | 6/2003 | Dines et al. ................. 600/427 |
| 6,885,762 B2 | * | 4/2005 | Saha et al. .................. 382/131 |

FOREIGN PATENT DOCUMENTS

| | | |
|---|---|---|
| EP | 0548527 | 6/1993 |
| WO | 9616534 | 6/1996 |

OTHER PUBLICATIONS

U.S. Appl. No. 09/450,489, filed Nov. 29, 1999 in the Name of Bothorez et al.

* cited by examiner

*Primary Examiner*—Samir Ahmed
*Assistant Examiner*—ONeal R. Mistry
(74) *Attorney, Agent, or Firm*—Cantor Colburn LLP

(57) ABSTRACT

A region of interest is selected in an input image, such as a digital or analog image form a mammography apparatus. Display parameters for the input image or a part thereof are determined as a function of the region of interest. The image or a part thereof is displayed using the determined parameters. Choosing display parameters as a function of the region of interest optimizes the display of the possible region of interest without any adjustment by the operator.

26 Claims, 2 Drawing Sheets

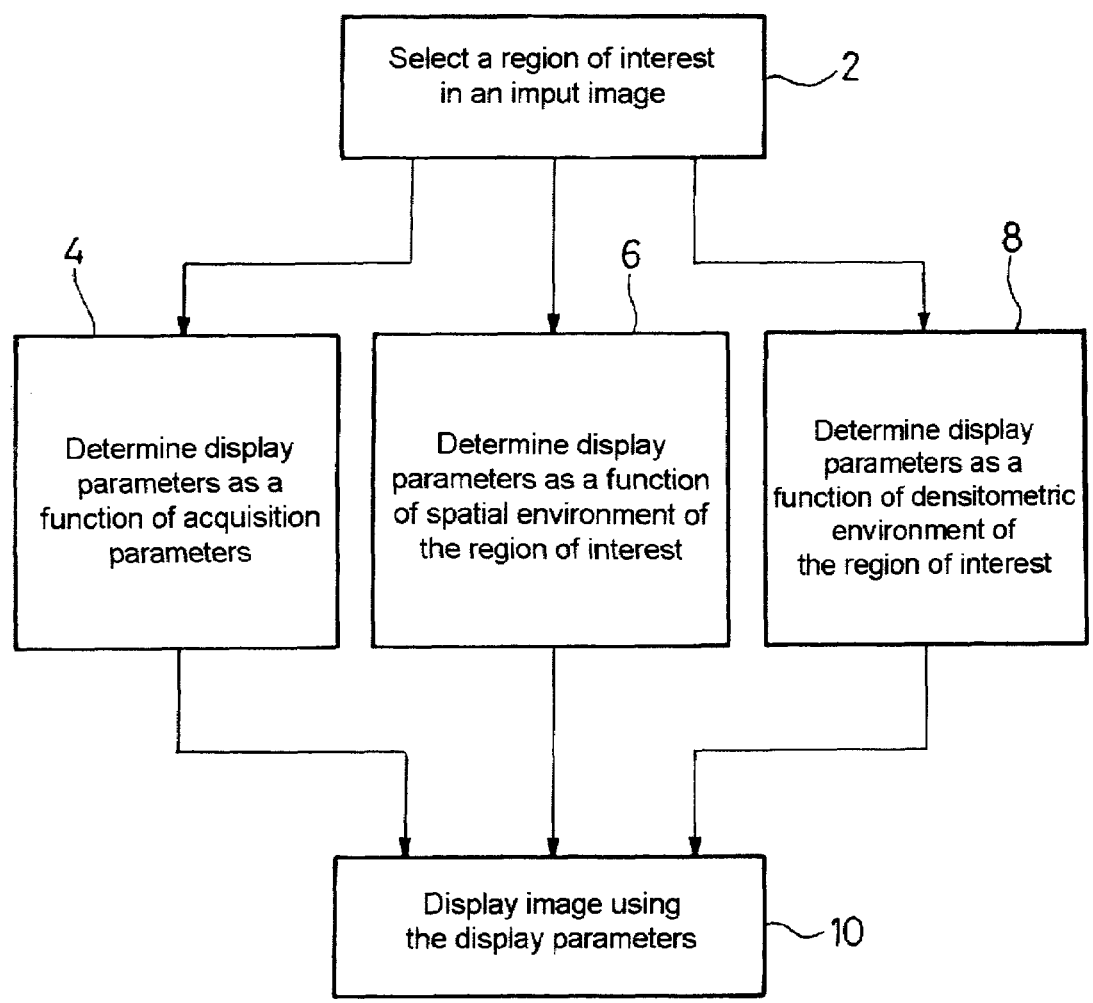

FIG_2
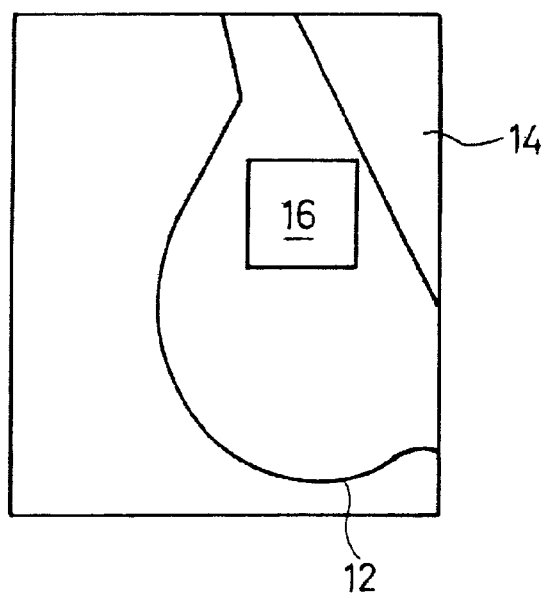
FIG_3
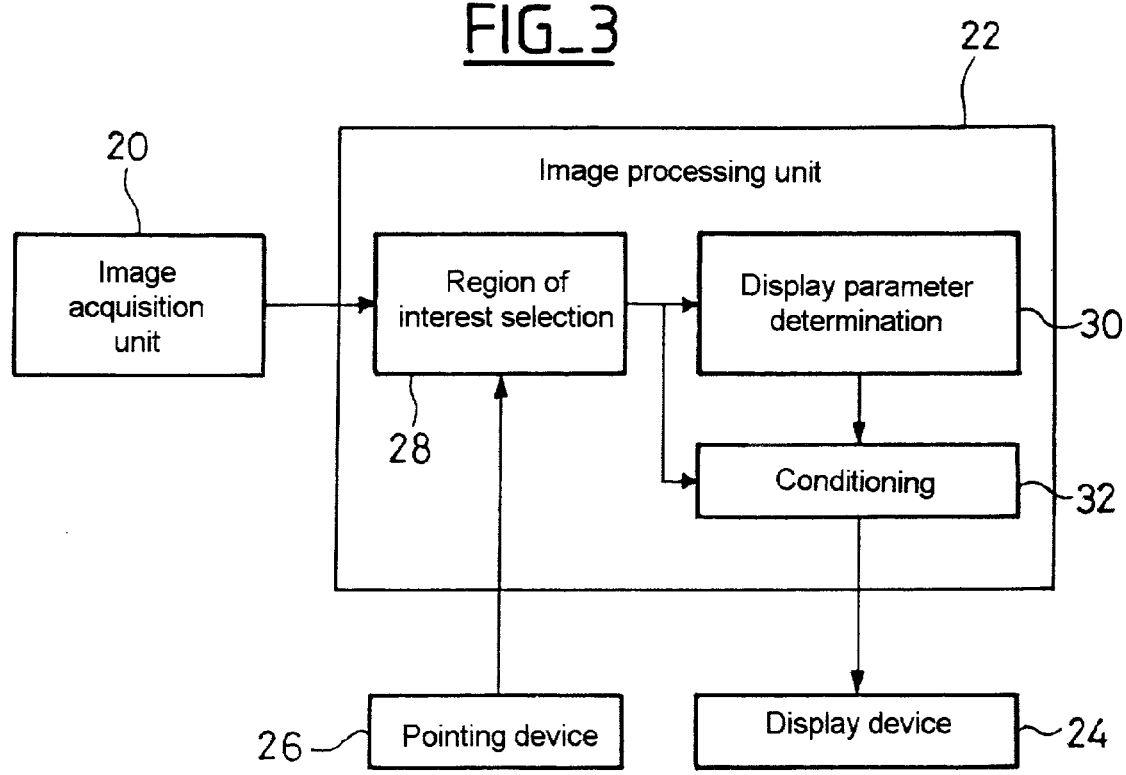

METHOD AND APPARATUS FOR DISPLAYING IMAGES OF AN OBJECT

CROSS-REFERENCE TO RELATED APPLICATIONS

This application claims the benefit of a priority under 35 USC 119 to French Patent Application No. 01 07519 filed Jun. 8, 2001, the entire contents of which are hereby incorporated by reference.

BACKGROUND OF THE INVENTION

This invention relates to the display of an image, particularly a digital image, and more particularly, an image of an object, such as a human body, and still more particularly, to display parameter adjustment of digital images of parts of the body. This invention applies to a radiographic apparatus, and more particularly, to mammography.

A mammography apparatus is used for examining the breasts of a patient using X-rays. The image is acquired using means for receiving an image by, for example, a photographic or by means for digital sensing. GE Medical Systems Global Technology Company, LLC, has commercially available a digital mammography under the trade name Sensographe 2000D. The images acquired in this apparatus are displayed on a screen for the operator's attention and inspection. For presenting digital images on the screen, one of the methods employed in this apparatus comprises adjusting contrast and brightness of the image display. For this purpose, a gray level histogram is calculated on the acquired image. Using the calculated histogram, a mean gray level and a gray level range are determined for the display. This determination is done using a look-up table to identify between image gray levels provided by the acquired image and gray scale levels in the displayed image. Adjusting gray levels varies the contrast and brightness of the image displayed on the screen. This method is disclosed in FR 2,786,589.

This apparatus additionally allows part of the image to be magnified on the screen using a soft magnification function. In this case, image contrast and brightness are not modified for displaying the magnified part of the image on the screen.

The operator may be interested in a specific part of the image. This can apply when the soft magnification function is used or again when the operator is using a spot-type compression paddle. The paddle is a device fitted in a ring at one end, allowing compression of a part of the breast to be examined. In this case, the image contrast and brightness are, overall, suited to the complete image but does not allow suitable presentation of the image in the region of interest.

BRIEF DESCRIPTION OF THE INVENTION

In one embodiment of the invention, a region of interest is defined in the image for display. Image display parameters, for example, contrast and brightness or gray levels, are adjusted as a function of the defined region of interest. Image display parameter adjustment ensures that the region of interest is displayed using suitable display parameters.

BRIEF DESCRIPTION OF THE DRAWING

FIG. 1 is a flow chart of a method according to an embodiment of the invention;

FIG. 2 shows, diagrammatically, an image in a mammography apparatus and a region of interest defined within this image; and FIG. 3 shows mammography apparatus in diagrammatic form.

DETAILED DESCRIPTION OF THE INVENTION

FIG. 1 is a flow chart of the method according to an embodiment of the invention. In the example of FIG. 1, the method is implemented in a digital mammography apparatus. The method can also be implemented in other apparatus and, for example, in an analog mammography apparatus. In an analog mammography apparatus, the analog images can be digitized for subsequent display on a screen.

In step 2, a region of interest is chosen in an acquired image provided by the mammography apparatus. This image will be indicated below as the input image. Various solutions can be used for selecting this region of interest in the input image, whether the latter is displayed or not. When a soft magnification function is implemented, the region of interest can correspond to that part of the input image that will be magnified by the soft magnification function. The position of this region of interest is in that case determined by the operator typically using a pointing device or by choosing coordinates in a system defined on the screen. The size of the region of interest can then depend on the chosen magnification factor. The higher this factor, the greater the image is magnified, and the smaller the size of the region of interest. This corresponds to the case where the magnified image is displayed with a determined size. When a spot-type compression paddle is used, the region of interest can be defined as that part of the input image corresponding to the inside of the ring at the end of the compression paddle. This region of interest can be determined by recognizing the shape of the spot-type compression paddle on the input image using image analysis techniques known per se. Once the shape of the compression paddle has been recognized, the inside of the ring can be determined. Another way of determining the region of interest in the input image comprises choosing, using a pointing device or some other input/output device, part of the input image. This means that the operator manually defines a region of interest in the input image.

After having selected a region of interest in the input image, the image display parameters are chosen as function of the defined region of interest. These display parameters depend on the means for display, i.e., the device used for the image restitution. In the case of a cathode ray tube or liquid crystal device, brightness and contrast, can also be, for these types of devices, a mean gray scale level and a gray scale level range. If the display device is a printer, the term "display" being taken in its widest sense, the display parameters can be the print parameters of the printer.

FIG. 1 shows three embodiments for determining the display parameters. IN the embodiment of step 4, the display parameters are determined as a function of the input image acquisition parameters in the image acquisition part of the mammography apparatus. These image acquisition parameters can comprise the excitation voltage of the X-ray source, the current flowing in the source anode, type of anode, type of filter, breast thickness, exposure time or other factors defining the operation of the image acquisition part of the apparatus.

In the embodiment of step 6, the display parameters are determined as a function of the spatial environment of the chosen region of interest. The spatial environment can be a function of the nature of the image such as the position of the region of interest in the image. For example, in a side view of the breast shown in FIG. 2, in the right-hand part of the input image is the pectoral part 14. If the region of interest chosen is located in this right-hand part of the input image, it can be assumed that the region of interest is located in the pectoral part. The display parameters can now be chosen taking into account results ordinarily obtained for this pectoral part in the mammography apparatus. Another example is the dense part and the adipose part of a breast. The display parameters can be chosen as a function of the position of the region of interest 16 in this dense part or adipose part.

In the embodiment of step 8, the display parameters are determined as a function of densitometric environment. This is done by calculating the gray level histogram in the region of interest of the input image. From this histogram, the mean gray scale level and the gray scale range are chosen using a look-up table.

Once the display parameters have been determined, the process continues to step 10 where the image is displayed using the display parameters determined. The displayed image can be the full input image, as in the case when the image magnification function is not used. The displayed image can also be part of the input image, as in the case when the soft magnification function is used. As the display parameters for the image were determined as a function of the region of interest, the latter is displayed with parameters optimized for the operator to view this region. The method avoids the need for the operator to intervene manually for adjusting the display parameters, improves apparatus ergonomics and speeds up throughput. Another advantage is the reduction in processing time required to determine the display parameter, as the region of interest is smaller that the full input image, and display parameter determination is faster.

FIG. 2 is a diagrammatic view of an image in a mammography apparatus and a region of interest defined inside the image. The image shown in FIG. 2 is a side view of a patient's breast The image shows the contour 12 of the breast, the pectoral region 14 to the right of the image, as well as a region of interest 16 indicated by a window on FIG. 2. It appears that the region of interest is not situated in the pectoral region but rather in the dense or adipose part of the breast.

FIG. 3 shows diagrammatically a mamograph or mammography apparatus. The apparatus has a means 20 for acquiring an image. This is, for example, an image receiver of a digital apparatus, or again, in a digitizing device for analog images or, yet again, a unit receiving storage media containing a digital or analog image. The means 20 for acquisition of an image could also be a storage media such as a hard disk. The means 20 for acquisition of an image provides an input image to the means 22 for image processing. The means 22 for image processing determines, for the complete image, display parameters as is done in the state-of-the art techniques. The means 22 for image processing delivers the input image along with the display parameters to means 24 for display. In the drawing, means for input/output in the form of a pointer 26 is shown The pointer 26 is connected to the means for image acquisition and allows the operator to select a region of interest in the input image. The means 24 for display can be of any type whatsoever and can, for example, comprise a cathode ray tube or a liquid crystal display device. The means 22 for image processing can be a PC (personal computer), an image processing board including a microprocessor, or any other digital computing means known per se. The means 22 for image processing comprises several features, for example, means for logic blocks in the means for image processing. Block 28 handles the selection of a region of interest and allows the operator to define a region of interest in the image. Block 30 is a display parameter determination block that receives information concerning the region of interest provided by the selection block 28. Block 32 conditions the image to be displayed, i.e., whether this is the full input image or a part thereof, and delivers this image to the display device along with the processing operations which can be applied to the images.

The method is not limited to the example given in FIG. 1. In FIG. 1, the three embodiments allowing the image display parameters for the displayed image to be determined are alternatives. The flow chart shows the three embodiments in three steps 4, 6, and 8, forming three branches between step 2 for determining the region of interest and step 10 for displaying the image. However, this is only a convention for facilitating using one of the embodiments. A combination of the three embodiments is also possible for adjusting the display parameters. For example, a linear combination of the three embodiments or, again could involve rules for applying one or several of the possible embodiments. For example, an embodiment could be chosen as a function of the nature of the image, the choice of the region of interest or be dependent on operator choice.

The method also applies to display of body parts or organs other than those provided by mammography, and can be applied to any radiography apparatus.

Various modifications in structure and/or function and/or steps may be made by one skilled in the art without departing from the scope and extent of the disclosed embodiments of the invention.

What is claimed is:

1. A method for displaying an image of an abject comprising:
   selecting a region of interest in an input image;
   recognizing a contour of a compression paddle in the input image;
   selecting as the region of interest part of the input image corresponding to that portion of the object compressed by the compression paddle and inside of a ring at the end of the compression paddle;
   determining display parameters as a function of a position of a dense or adipose part of the region of interest selected, the display parameters comprising at least one of image brightness and image contrast; and
   displaying the input image or a part of the input image using the determined display parameters, thereby displaying the input image or part thereof using display parameters suitable for viewing the region of interest.

2. The method according to claim 1 comprising:
   selecting as the region of interest, part of the input image to be enlarged by magnification.

3. The method according to claim 1 comprising:
   selecting a region of interest using an input/out device.

4. The method according to claim 1 wherein determining display parameters is performed as a function of image acquisition parameters.

5. The method according to claim 2 wherein determining display parameters is performed as a function of image acquisition parameters.

6. The method according to claim 1 wherein determining display parameters is performed as a function of image acquisition parameters.

7. The method according to claim 3 wherein determining display parameter is performed as a function of image acquisition parameters.

8. The method according to claim 1 wherein determining display parameters is performed as a function of a spatial environment of the region of interest within the input image.

9. The method according to claim 2 wherein determining display parameters is performed as a function of a spatial environment of the region of interest within the input image.

10. The method according to claim 1 wherein determining display parameters is performed as a function of a spatial environment of the region of interest within the input image.

11. The method according to claim 3 wherein determining display parameters is performed as a function of a spatial environment of the region of interest within the input image.

12. The method according to claim 4 wherein determining display parameters is performed as a function of a spatial environment of the region of interest within the input image.

13. The method according to claim 1 wherein determining display parameters is performed as a function of a densitometric environment of the region of interest.

14. The method according to claim 2 wherein determining display parameters is performed as a function of a densitometric environment of the region of interest.

15. The method according to claim 1 wherein determining display parameters is performed as a function of a densitometric environment of the region of interest.

16. The method according to claim 3 wherein determining display parameters is performed as a function of a densitometric environment of the region of interest.

17. The method according to claim 4 wherein determining display parameters is performed as a function of a densitometric environment of the region of interest.

18. The method according to claim 8 wherein determining display parameters is performed as a function of a densitametric environment of the region of interest.

19. The method according to claim 1 wherein to display parameters comprise brightness and contrast.

20. The method according to claim 1 wherein the display parameters comprise gray scale level and a gray scale level range.

21. The method according to claim 19 wherein the display parameters comprise gray scale level and a gray scale level range.

22. The method according to claim 1 wherein the image is a digital image.

23. The method according to claim 1 wherein the image is an analog image.

24. An apparatus for displaying images of an object comprising:
   means for acquiring an image;
   means for image processing for receiving an input image provided by the means for acquisition;
   an input/output device linked to the means for image processing;
   means for display linked to the means for image processing;
   wherein the means for image processing comprises:
      means for selecting a region of interest defining within an input image a region of interest as a function of information provided by the input/out device;
      means for recognizing a contour of a compression paddle in the input image;
      means for selecting as the region of interest part of the input image corresponding to that portion of the object compressed by the compression paddle and inside of a ring at the end of the compression paddle;
      means for determining display parameters as a function of a position of a dense or adipose part of a selected region of interest, the display parameters comprising at least one of image brightness and image contrast; and
      means for conditioning an image to be displayed, provided by the means for display with an image to be displayed and the displayed parameters determined, thereby providing for display of the input image or part thereof using display parameters suitable for viewing the region of interest.

25. The method according to claim 1 comprising:
   recognizing a contour of a spot-type compression paddle having a recognizable shape at an end thereof, and
   selecting as the region of interest part of the image corresponding to that region of the object inside the recognized contour.

26. The method according to claim 1, further comprising:
   using image analysis, automatically selecting as the region of interest part of the image corresponding to that region of the object inside the recognized contour of the compression paddle.

* * * * *